US009326129B2

(12) United States Patent
Bennett et al.

(10) Patent No.: US 9,326,129 B2
(45) Date of Patent: *Apr. 26, 2016

(54) COMMUNICATION METHOD AND INFRASTRUCTURE SUPPORTING DEVICE SECURITY AND TRACKING OF MOBILE AND PORTABLE MULTIMEDIA DEVICES

(71) Applicant: Broadcom Corporation, Irvine, CA (US)

(72) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/328,344

(22) Filed: Jul. 10, 2014

(65) Prior Publication Data

US 2014/0323115 A1    Oct. 30, 2014

Related U.S. Application Data

(63) Continuation of application No. 14/063,719, filed on Oct. 25, 2013, now Pat. No. 8,805,327, which is a continuation of application No. 12/323,336, filed on Nov. 25, 2008, now Pat. No. 8,577,333.

(51) Int. Cl.
| | | |
|---|---|---|
| *H04W 8/24* | (2009.01) | |
| *H04L 29/06* | (2006.01) | |
| *H04W 8/22* | (2009.01) | |
| *H04W 12/02* | (2009.01) | |
| *H04L 29/08* | (2006.01) | |
| *H04W 4/02* | (2009.01) | |
| *H04M 1/66* | (2006.01) | |

(52) U.S. Cl.
CPC ............... *H04W 8/24* (2013.01); *H04L 63/30* (2013.01); *H04L 67/22* (2013.01); *H04W 4/02* (2013.01); *H04W 8/22* (2013.01); *H04W 12/02* (2013.01); *H04M 1/66* (2013.01)

(58) Field of Classification Search
CPC ......... H04L 63/30; H04L 67/22; H04M 1/66; H04W 12/02; H04W 4/02; H04W 8/22; H04W 8/24
See application file for complete search history.

(56) References Cited

U.S. PATENT DOCUMENTS

| | | | |
|---|---|---|---|
| 8,401,521 B2 | 3/2013 | Bennett et al. | |
| 8,805,327 B2 * | 8/2014 | Bennett | H04L 63/30 455/410 |
| 2002/0121975 A1 | 9/2002 | Struble et al. | |
| 2005/0030322 A1 | 2/2005 | Gardos | |
| 2005/0222933 A1 | 10/2005 | Wesby | |

(Continued)

*Primary Examiner* — Kashif Siddiqui
(74) *Attorney, Agent, or Firm* — Brinks Gilson & Lione

(57) ABSTRACT

From a laptop and a client server interface, a subscriber securely initiates tracking and/or disabling of an electronic device by a server. The subscriber receives location and/or usage reports for the electronic device. The subscriber is provided with the capability to modify a profile, device status and/or transfer ownership of the electronic device via a client server interface. Based on the profile, detection of a particular event triggers tracking and/or disabling of the device by the server. The electronic device registers with the server utilizing its unique device ID and/or the subscriber identity information when accessing the internet. The server is enabled to communicate a status and/or a request for tracking information, to the electronic device. The server is also enabled to receive tracking and/or location information and communicates it to the subscriber's laptop.

20 Claims, 4 Drawing Sheets

(56) References Cited

U.S. PATENT DOCUMENTS

| | | |
|---|---|---|
| 2006/0276172 A1 | 12/2006 | Rydgren et al. |
| 2008/0114862 A1* | 5/2008 | Moghaddam ..... G06F 17/30899 709/220 |
| 2009/0253410 A1* | 10/2009 | Fitzgerald ............... G06F 21/88 455/411 |
| 2010/0130167 A1 | 5/2010 | Bennett et al. |
| 2013/0203387 A1 | 8/2013 | Bennett et al. |

* cited by examiner

COMMUNICATION METHOD AND INFRASTRUCTURE SUPPORTING DEVICE SECURITY AND TRACKING OF MOBILE AND PORTABLE MULTIMEDIA DEVICES

CROSS REFERENCE TO RELATED APPLICATIONS

This application is a continuation of application Ser. No. 14/063,719, filed Oct. 25, 2013, pending, which is a continuation of application Ser. No. 12/323,336, filed Nov. 25, 2008, issued as U.S. Pat. No. 8,577,333 on Nov. 5, 2013, both of which are incorporated herein by reference in their entirety.

TECHNICAL FIELD

Certain embodiments of the invention relate to communication systems. More specifically, certain embodiments of the invention relate to a communication method and infrastructure supporting device security and tracking of mobile and portable multimedia devices.

BACKGROUND

For many people, utilizing a plurality of mobile or stationary electronic devices has become a part of everyday life. Mobile devices have evolved from a convenient method for voice communication to multi-functional resources that offer, for example, still and moving image features, media playback, electronic gaming, Internet browsing, and email. Cellular phones with built-in cameras, or camera phones, have become prevalent in the mobile phone market, due to the low cost of CMOS image sensors and the ever increasing customer demand for more advanced cellular phones. Moreover, an increasing number of electronic devices are enabled to determine their geographic location. For example, various communication devices, such as a mobile phone, comprise an integrated global navigation satellite system (GNSS) receiver. Alternatively, various portable devices interface with an external GNSS receiver. In this regard, a handheld computer may be coupled with a GNSS receiver via a communication cable or via a wireless connection such as a Bluetooth connection. Regardless of whether a GNSS receiver is integrated or external, it is enabled to acquire a position fix autonomously or may utilize the assistance of a ground based reference system.

Further limitations and disadvantages of conventional and traditional approaches will become apparent to one of skill in the art, through comparison of such systems with the present invention as set forth in the remainder of the present application with reference to the drawings.

BRIEF SUMMARY

A communication method and infrastructure supporting device security and tracking of mobile and portable multimedia devices, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION

Certain embodiments of the invention may be found in a communication method and infrastructure supporting device security and tracking of mobile and portable multimedia devices. In various embodiments of the invention, a subscriber initiates, from a first communication device, for example a laptop, tracking and/or disabling of at least a portion of the functionality of a second communication device, for example a cellular phone. In this regard, the subscriber owns the first and second communication devices. In response to the subscriber's initiation of the tracking and/or disabling of the second device functionality, the subscriber receives usage reports and/or location reports for the second communication device at the first communication device. The second communication device is tracked based on a unique device identifier (ID) of the second communication device which is stored within its independent and/or static memory. The subscriber is enabled to securely access a server via a client server interface from the first communication device for configuring and/or initiating the tracking and/or disabling of the second communication device. In addition, the subscriber is provided with the capability to change a status of the second communication device and/or transfer secure access permission to another person via the client server interface.

A particular operation and/or event of a first communication device, for example a cellular phone, is detected based on a profile associated with the first communication device. In response to detecting the particular operation, tracking of the first communication device and/or disabling functionality of the first communication device is based on the profile. A status and/or request for tracking information is communicated to the first device. Location and/or usage information from the tracking is communicated to a second tracking device, for example, a laptop based on the profile. The second communication device receives the location and/or usage information. The profile specifies how tracking is done and/or which functions to disable. The profile comprises a status of the first communication device and is modifiable by an authorized user via a client interface. When the first device initiates access to a network, its unique device ID and/or a user's identity information is received from the first device.

Figure 1:
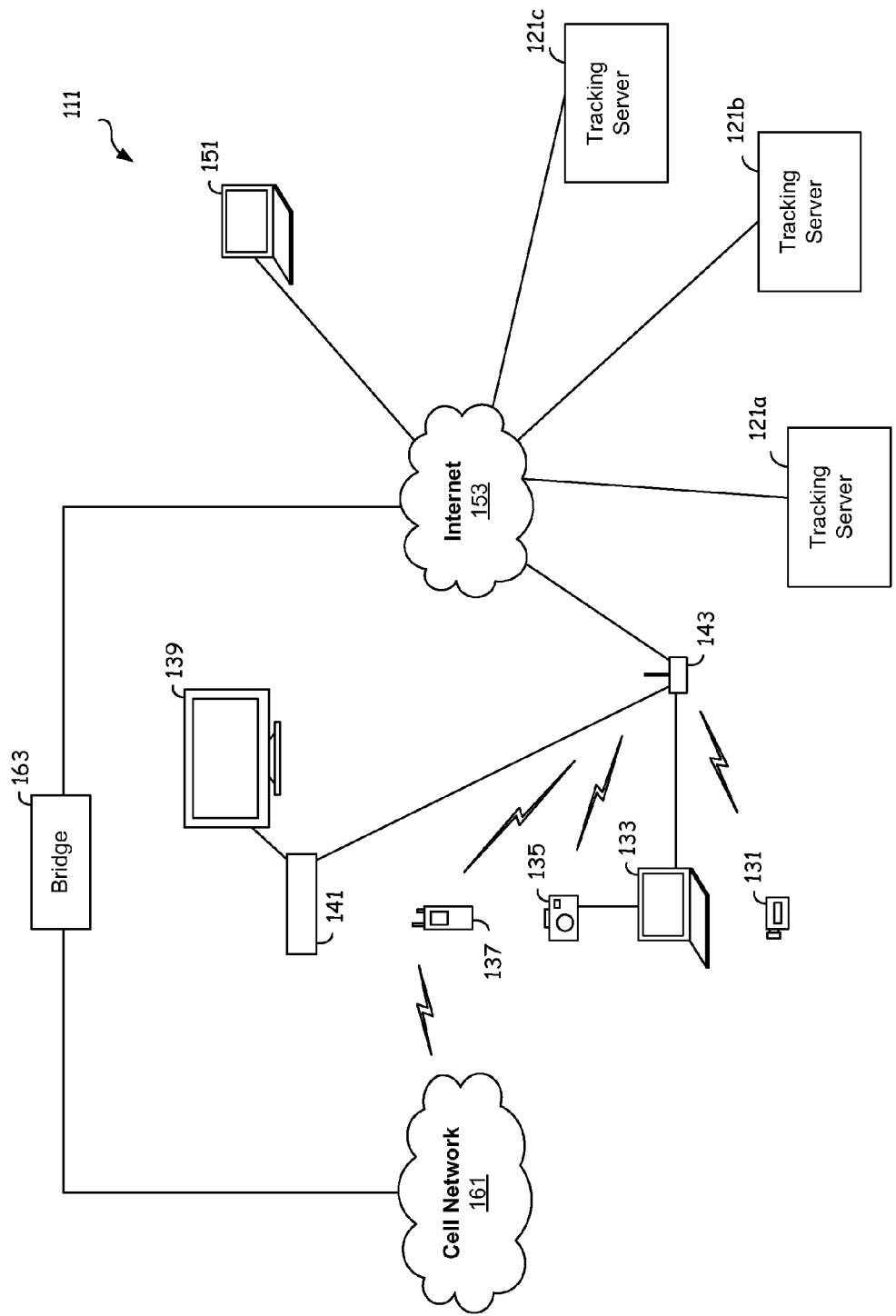
FIG. 1 is a block diagram illustrating an exemplary infrastructure for tracking an endpoint device, in accordance with an embodiment of the invention.

FIG. 1 is a block diagram illustrating an exemplary infrastructure for tracking an endpoint device, in accordance with an embodiment of the invention. Referring to FIG. 1, there is shown a plurality of tracking servers 121a, 121b, 121c, a video camera 131, a laptop 133, a digital camera 135, a cell phone 137, a set-top-box 141, a television 139, a router 143, a laptop 151, a cellular network 161, a bridge 163 and the Internet 153.

The video camera 131, laptop 133, digital camera 135, cell phone 137, set-top-box 141 and television 139 are exemplary endpoint communication devices that each, comprise a unique device ID that is protected against erasure, editing or replacement. The endpoint devices are collectively referred to as endpoint devices 131-141. Each of the endpoint devices 131-141 comprise suitable logic, circuitry and/or code that are enabled to communicate via a plurality of communication technologies. For example, the endpoint devices 131-141 communicate via wireless, wire-line and/or optical media and utilize any suitable communications protocol. In addition, the endpoint devices 131-141 comprise a plurality of communication interfaces, for example, long, medium or short range wireless technologies. These wireless technologies comprise, for example, cellular, wireless LAN and/or Bluetooth respectively. Moreover, the endpoint devices 131-141 are managed by one or more tracking servers such as the tracking servers 121a, 121b and 121c.

The cellular phone 137 comprises suitable logic, circuitry and/or code that is operable to set up voice calls and/or data sessions via the cell network 161 and/or bridge 163. For example, the cellular phone 137 accesses the Internet 153 and/or other networks via the cell network 161 and bridge 163. In various embodiments of the invention, the cellular phone 137 is enabled to communicate via a wireless LAN connection and the router 143 with the Internet 153 and/or other networks. In addition, the cellular phone 137 may have a Bluetooth interface for short range wireless communication with another device for example. The cellular phone 137 is communicatively coupled with one or more tracking servers 121a, 121b and/or 121c via one or more paths such as via the cellular network 161, the bridge 163 and the Internet 153 or the router 143 and the Internet 153. Furthermore, the cellular phone 137 comprises a GNSS receiver such as GLONASS receiver and/or GPS, receiver and/or is enabled to determine its geographic location by network assisted and/or autonomous methods. In some embodiments of the invention, the GNSS receiver is coupled to the cellular phone 137 via a wired or wireless connection.

The digital camera 135 and the video camera 131 comprise suitable logic, circuitry and/or code that is enabled to capture still and/or moving digital images and to store image data. In addition, the digital camera 135 and the video camera 131 are enabled to upload and/or download image data files to the Internet 153, for example, via the laptop 133 and/or the router 143. The digital camera 135 and the video camera 131 are communicatively coupled to one or more of the tracking servers 121a, 121b and 121c via the laptop 133, the router 143 and the Internet 153. Furthermore, the digital camera 135 and/or video camera 131 comprise a GNSS receiver such as a GPS receiver and/or GLONASS receiver, and/or is enabled to determine a geographic location by network assisted and/or autonomous methods. In some embodiments of the invention, the GNSS receiver is coupled to the cellular phone 137 via a wired or wireless connection.

The set-top-box 141 and television 139 comprise suitable logic circuitry and/or code to enable reception of video and/or audio data via the Internet 153 and/or router 143, via a cable service and/or via satellite for example. The set-top-box 141 and/or television 139 exchanges control data with for example a multi-media network head-end via the router 143 and/or the Internet 153. In addition, the set-top-box 141 and/or television 139 are communicatively coupled to one or more tracking servers 121a, 121b and 121c via the router 143 and/or internet 153 for example. Furthermore, the set-top-box 141 and/or television 139 comprise a GNSS receiver such as a GPS receiver and/or GLONASS receiver, and/or is enabled to determine a geographic location by network assisted and/or autonomous methods.

The laptop 151 is a computing device that comprises suitable logic circuitry and/or code to communicate via one or more communication interfaces and is enabled to communicate via one or more wireless and/or tethered communication technologies with the internet 153. The laptop 151 comprises a user interface that enables a user to access one or more of the tracking servers 121a, 121b and 121c and to interface with tracking server functionality. The laptop 151 is communicatively coupled with one or more of the tracking servers 121 via the internet 153 and/or other communication network facilities. Notwithstanding, the invention is not limited to utilizing any specific device such as the laptop 151 for interfacing with the one or more tracking servers 121 and utilize any suitable computing and/or communication device enabled to support a browser and/or non-browser user interface. For example, the laptop or other computing device interfaces with the one or more tracking servers 121 via any suitable client server communication such as a java applet or command line interface and communicates over a private network rather than the Internet.

The tracking servers 121a, 121b, 121c comprise suitable logic, circuitry and/or code to enable tracking and/or managing of one or more endpoint devices such as the video camera 131, the laptop 133, the digital camera 135, the cell phone 137, the set-top-box 141 and the television 139. In this regard, the tracking servers 121 is enabled to establish and configure a user account for an owner and/or authorized user of one or more of the endpoint devices 131-141. For example, a profile for configuring or activating various tracking server 121 features for a specified user may be created. The profile comprises default and/or modified parameters. The profile is password protected and the owner and/or authorized user is enabled to modify the profile. The tracking servers 121 comprise unique IP addresses and may provide a secure interface for the owner and/or authorized user of the one or more of the endpoint devices 131-141 to register and/or manage the endpoint devices 131-141. For example, a plurality of tracking and/or management features for the one or more endpoint devices 131-141 comprises geographic location retrieval and/or location tracing of an endpoint device 131-141, determining usage history, disabling and/or enabling all or a portion of an endpoint device's functionality and/or communicating with an endpoint device 131-141 via a call and/or a messaging with the device. In various embodiments of the invention, the tracking server 121 is operable to contact an owner of the one or more endpoint devices 131-141 in instances where a specified type of activity or behavior in the endpoint device is detected. For example, the tracking server 121 is operable to send an email to the owner when a device is utilized outside of a specified geographical area.

In various embodiments of the invention, only one tracking server may be available to manage the one or more endpoint devices 131-141. For example, an endpoint device is managed by only one tracking server 121. In other embodiments of the invention, a plurality of tracking servers, 121a, 121b, 121c and/or other tracking servers is utilized to manage the endpoint devices 131-141. In addition, there may be one or more service providers that offer an endpoint device management service and that utilize the one or more tracking servers such as 121a, 121b and/or 121c. In various embodiments of the invention, the tracking servers 121, and tracking software is utilized by a government body and/or by other authorized individuals. In addition, tracking server software is loaded on any suitable computing device and utilized to manage and/or track one or more of the endpoint devices 131-141. For example, one or more authorized individuals utilize tracking server software on their own computing device to manage one or more of the endpoint devices 131-141.

Information regarding one or more of the endpoint devices 131-141 and/or regarding an owner or authorized user of the one or more endpoint devices 131-141 is maintained by one or more of the tracking servers 121 service providers. For example, information such as unique endpoint 131-141 device IDs, SIM card IDs, endpoint device geographic locations and/or endpoint device status is communicated between tracking servers routinely and/or on an as need basis. In various embodiments of the invention, there is a centralized service that maintains device and/or user information and that shares the information with one or more of the tracking servers 121.

In operation, an owner or user of one or more of the endpoint devices 131-141 purchases and/or registers for an endpoint device tracking service. An account is created on one or more of the tracking servers 121 for the owner and/or one or more authorized users that enables the owner and/or authorized user to manage their one or more endpoint devices 131-141. The user and/or owner provides security information such as a unique device ID for each of the managed endpoint devices and establish a password for accessing the tracking server 121 functionality. In addition, an owner or user profile is created on the one or more tracking servers 121 according to "user" preferences to configure security management and/or to enable various endpoint device management and/or tracking features. The authorized user and/or owner gains secure access to the one or more tracking servers 121 via a user interface, for example a browser on the laptop 151. The user interface provides secure login and/or device management screens for activating and/or interfacing with the endpoint device tracking and/or management features. In some embodiments of the invention, the owner and/or authorized user accesses the tracking server 121 management and/or tracking screens via one or more of the endpoint devices 131-141, for example.

An authorized owner and/or user of the one or more of the endpoint devices 131-141 may misplace a device such as the cellular phone 137. In this regard, the authorized owner and/or user accesses tracking server 121 management screens via the laptop 151. The authorized owner and/or user requests the geographic location of the cellular phone 137 via an endpoint device management screen. The tracking server 121 is operable to communicate with the missing cellular phone 137 and retrieve the phone location and report it back to the authorized owner and/or user via the laptop 151.

Figure 2:
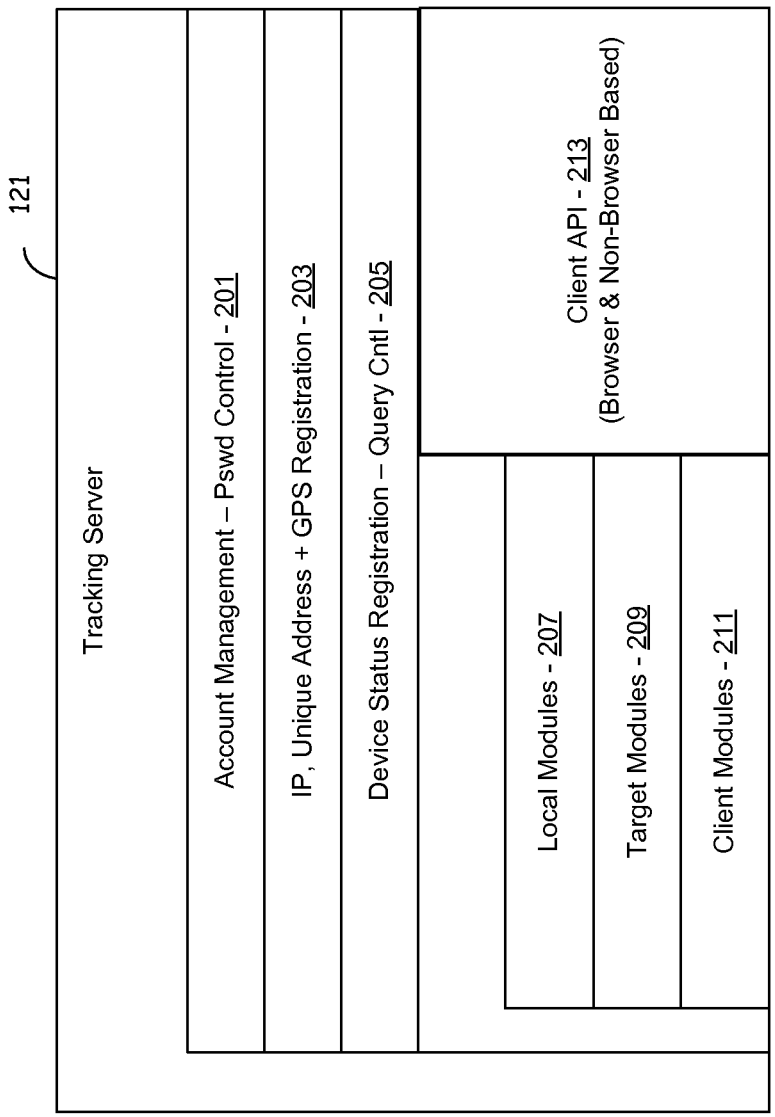
FIG. 2 is a block diagram illustrating exemplary functional elements within a device tracking server, in accordance with an embodiment of the invention.

FIG. 2 is a block diagram illustrating exemplary functional elements within a device tracking server, in accordance with an embodiment of the invention. Referring to FIG. 2, there is shown a tracking server 121, account management and password control functionality 201, IP, unique address and GPS registration functionality 203, device status and registration query control functionality 205, local modules 207, target modules 209, client modules 211 and client API 213.

The tracking server 121 is similar and/or substantially the same as the tracking servers 121a, 121b and 121c described with respect to FIG. 1.

The account management and password control functionality 201 of the tracking server 121 enables establishment and maintenance of an account for an owner and/or user of an endpoint device such as 131-141. The account management and password control functionality 201 enable storage and management of a user profile. Information in the user profile enables secure access to the tracking server and configures device management and/or tracking features. An account is established and defined when a subscriber signs up for endpoint device tracking service. A password for accessing the endpoint device tracking service on the tracking server 121 is assigned to one or more users authorized to access the account. The one or more authorized users and/or owner of the managed endpoint devices 131-141 accesses the account as needed to modify the user profile. For example, the authorized user and/or owner reports that a device is missing and/or request information regarding its location. In addition, ownership of the device is transferred to a new user by modifying the user profile and providing a password for access to the account to the new owner and/or user.

The IP, unique address and GPS registration functionality 203 control communications between one or more of the endpoint devices 131-141 and one or more tracking servers 121a, 121b and 121c. In this regard, the one or more endpoint devices 131-141 routinely registers with one or more of the tracking servers 121 when the endpoint devices are powered on. In this manner, the one or more of the endpoint devices 131-141 provides their DNS assigned temporary IP addresses to the one or more tracking servers 121. This enables communication between the one or more endpoint devices 131-141 and the one or more tracking servers 121. Exemplary communication from the one or more tracking servers 121 to the mobile phone 137 comprise a command to lock or disable the phone's ability to make or receive calls and/or messages. In addition, when the one or more endpoint devices 131-141 register with the one or more tracking servers 121, the endpoint devices reports their geographic location which is captured by the IP, unique address and GPS registration. The captured geographic location of the mobile phone 137 enables a user to locate a missing phone for example.

The device status registration and query control functionality 205 manage the status of one or more endpoint devices 131-141. The device status registration and query control functionality 205 is utilized for storing information from an authorized owner and/or user or from an endpoint device, that determine which management and/or tracking features is activated within the tracking server 121. In addition, the device status registration and query control functionality 205 is responsible for communicating with the one or more endpoint devices 131-141. For example, an authorized user accesses a tracking server 121 via a device management screen and sets the status of an endpoint device, such as the mobile phone 137, as being missing. The device status registration and query control functionality 205 are utilized to activate various management and/or tracking features such as tracing the location of the cellular phone 137, based on the user's profile. The user then determines that the mobile phone 137 was stolen and reports the gathered location data to the police for further action. Moreover, the user or network operator has the capability to lock and/or disable the stolen mobile phone 137.

In various embodiments of the invention, in instances when an endpoint device such as 131-141 attempts to access the Internet 153, a challenge to the endpoint device's status is made. For example, when an endpoint device which is managed by one or more tracking servers 121, accesses the Internet 153, it communicates various information that is utilized by the tracking server 121 to authorize Internet access for the endpoint device. In this regard, the endpoint device, for example the digital camera 135 is operable to communicate its unique device ID. The device status registration and query control functionality 205 is operable to determine that the status of the digital camera 135 is that it has been stolen and orders the digital camera 135 to lock its ability to communicate digital image files. In another embodiment of the invention, the mobile phone 137 challenges its status by sending a device ID and SIM card ID. The device status registration and query control functionality 205 are operable to determine that the SIM card ID is not authorized to be utilized in the mobile phone 137 and commands the mobile phone to lock its communications capability.

The local module 207, target module 207 and/or client modules 211 work together to manage and activate tracking service functionality. The local module 207 is resident on the one or more tracking servers 121. The target module 209 resides on the endpoint devices 131-141. The target module 209 is downloaded from a tracking server 121 via, for example, the laptop 151. Alternatively, it is stored on the one or more endpoint devices 131-141 by a vendor of a tracking service, for example, at the point of sale or establishment of a tracking service account for example. The target module 209 is loaded on an end point device 131-141 during manufacturing of the device. The target module 209 is stored within the one or more endpoint devices such that it is easily be deleted or disabled by a firewall, for example. In this regard, the target module 209 is stored in firmware, ROM or in flash memory within an endpoint device's communications chip set, for example. The target module is enabled to enforce and/or execute commands from the tracking server 121. For example, when the target module 209 is resident on the mobile phone 137, it initiates a challenge and/or registers with the tracking server 121 and communicates various information. In addition, when the target module 209 is resident on the mobile phone 137, logs of calling activity and/or geographic location history are maintained and are communicated to the tracking server 121.

The client module comprises a user interface that is downloaded to the laptop 151. The user interface comprises a web based browser or any other suitable client server, user interface such as a Java based application. The user interface comprises screens for accessing the tracking server 121 and modifying user and/or device profiles and/or interfacing with tracking and/or management features. The client API 213 is a set of definitions, procedures and/or functions that enable the user interface on the laptop 151 to communicate parameters and/or call routines on the tracking server 121.

In operation, a tracking service account is established for an owner of a plurality of endpoint devices 131-141. The vendor of the tracking service account loads target modules 207 on the endpoint devices 131-141. The vendor of the tracking service account configures the established account with unique device IDs from the endpoint devices 131-141 and other security parameters such as a SIM card IDs and public key infrastructure public and/or private keys. The vendor provides the owner with an initial user name and/or password for access to the owner's account. In various embodiments of the invention, the vendor allocates a specific tracking server 121 to provide service to the owner of the devices 131-141. The owner has the capability to download client modules 211 to the owner's laptop 151 from the tracking server 121 and/or utilize a web browser to access account management screens handled by the tracking server 121. The owner has the capability to configure various tracking and/or management features for the endpoint devices 131-141 and indicates the status of the endpoint devices. An exemplary status comprises none or the endpoint devices 131-141 being missing. Notwithstanding, the owner configures the tracking service to maintain a history of geographic locations that are recorded when the endpoint devices 131-141 routinely register with the tracking server 121.

In an instance where one or more of the endpoint devices 131-141 are missing, the owner accesses the tracking server's account management screens and reviews the geographic location history to determine where the missing one or more endpoint devices 131-141 is located. If the owner determines that the missing one or more endpoint devices 131-141 have been stolen, the owner has the capability to change a status of the missing endpoint devices to unauthorized to function.

Subsequently, when an unauthorized user attempts to access the Internet with one of the missing endpoint devices 131-141, the missing endpoint device initiates a challenge to its status. The challenge will fail and based on the resident target module 209, the endpoint device has the capability to lock all or a portion of the functionality of the missing endpoint device.

Figure 3:
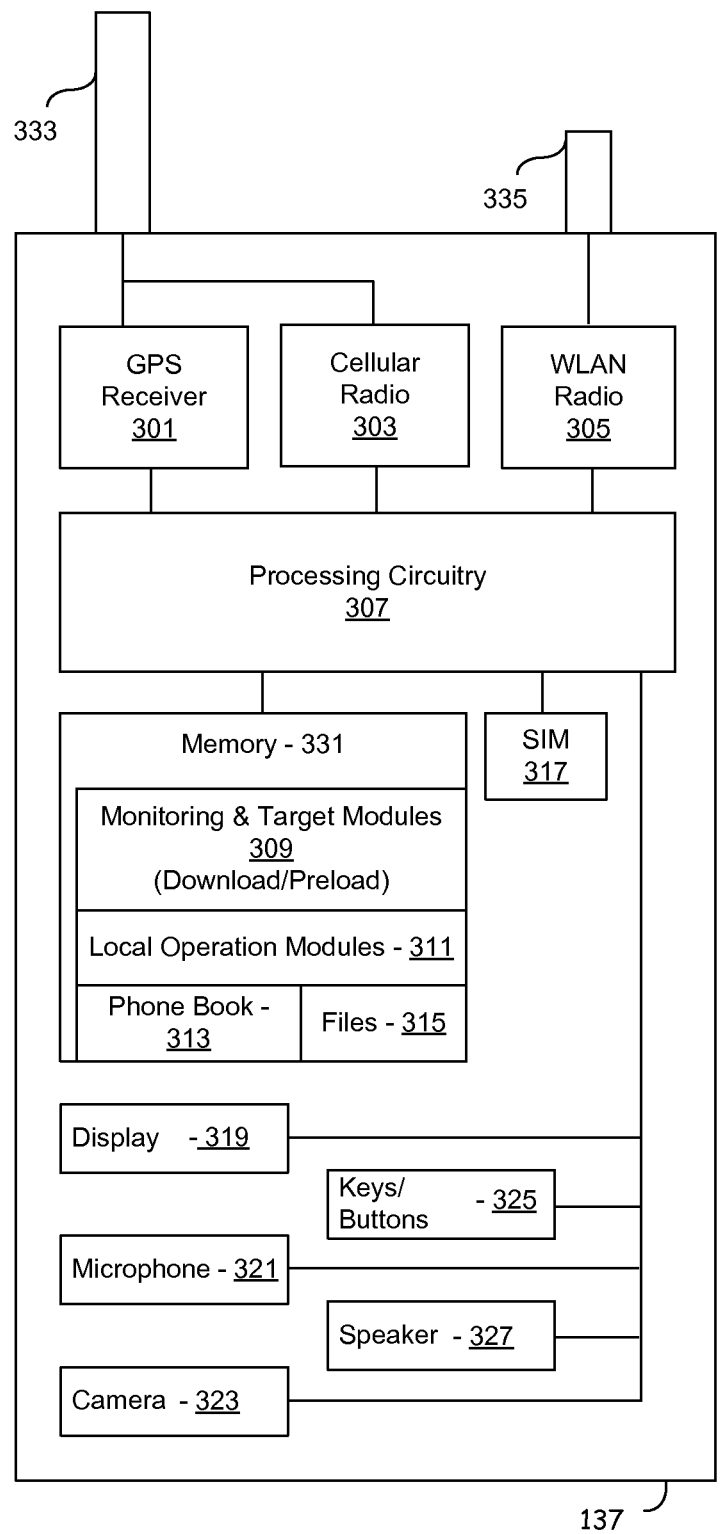
FIG. 3 is a block diagram illustrating exemplary device enabled for security and tracking functionality, in accordance with an embodiment of the invention.

FIG. 3 is a block diagram illustrating an exemplary endpoint device enabled for security and tracking functionality, in accordance with an embodiment of the invention. Referring to FIG. 3, there is shown the mobile phone 137 comprising a GPS receiver 301, a cellular radio 303, a wireless local area network (WLAN) radio 305, processing module 307, memory 331, monitoring and target modules 309, local operation modules 311, phone book 313, files 315, display 319, microphone 321, camera 323, keys and buttons 325, speaker 327, GPS and Cellular antenna 333 and WLAN antenna 305.

The mobile phone 137 is similar or substantially the same as the mobile phone described with respect to FIG. 1. The mobile phone 137 comprises a GPS receiver 301 which comprise suitable logic, circuitry and/or code to enable reception of GPS signals and determine a geographic location of the mobile phone 137. The mobile phone 137's geographic location is determined based on network assisted and/or autonomous methods for determining geographic location. Notwithstanding, the invention is not limited with regard to any specific type of geo-location technology and/or methods and utilize suitable technology and/or method for determining its location.

The cellular radio 303 comprises suitable logic circuitry and/or code to enable transmission and reception of RF cellular signals via the antenna 333. In addition, the cellular radio 303 is enabled to exchange signals with the processing module 307 for baseband processing. The cellular radio 303 is not limited by any specific type of wireless technology and utilizes any suitable wireless technology, for example, GSM, CDMA, WCDMA, OFDMA, LTE and WIMAX.

The WLAN radio 305 comprises suitable logic, circuitry and/or code to enable transmission and/or reception of RF signals for the communication of data traffic via the antenna 335. In addition, the WLAN radio 305 is operable to exchange data with the processing module 307 for baseband processing. The WLAN radio 305 communication may be based on any suitable data communication standard such as various IEEE 802.11 and/or Wi-Fi Alliance standards.

The processing module 307 comprises suitable logic, circuitry and/or code to enable processing of base band communication signals as well to support endpoint device tracking functionality for the mobile phone 137. The processing module 307 comprises one or more general purpose processors with various functions implemented in firmware and/or embedded special purpose processors. In some embodiments of the invention, the endpoint device tracking functionality is protected by secure operations. In this regard, the processing module 307 comprises a security processor to control secure communication between the endpoint device and tracking servers 121 and/or an on-chip embedded CPU, which utilize protected code, for example.

The SIM card 317 is a removable integrated circuit card that comprises suitable logic, circuitry and/or code operable to securely store a service subscriber key that is utilized to identify a service subscriber. The SIM card 317 is removable and may be removed from one device and utilized in another device and will identify the subscriber to a service provider from the other device for security and/or billing purposes. SIM card IDs that are authorized for an established tracking server account are registered with the tracking server. In the event that the mobile phone 137 is stolen and an unauthorized user's SIM card is detected, the tracking server and/or cellular phone 137 is operable to activate appropriate tracking service features for stolen phones.

The memory 331 comprises suitable logic, circuitry and/or code to provide storage for instructions and data for a plurality of tasks performed by the mobile phone 137. Regions of the memory 331 dedicated to endpoint device tracking functionality are stored in secure memory. For example, the monitoring and target modules 309 are implemented in secure and/or static memory such as ROM, firmware and/or on chip Flash memory. In this manner, unauthorized users are prevented from disabling the tracking functionality in the mobile phone 137. Also, a unique device ID for the mobile phone 137 and/or a secure user key are protected from modification or deletion by an unauthorized user. All or a portion of the target modules 309 are pre-loaded into the secure memory, for example, by an endpoint tracking service vendor. In various embodiments of the invention, all or a portion of the monitoring and target modules 309 comprise the target modules 209 that are described with respect to FIG. 2. In this regard, all or a portion of the target modules 209 is downloaded from the security processor 121 to one or more of the endpoint devices 131-141 such as the mobile phone 137.

The monitoring and target modules 309 comprise instructions and/or data for monitoring activity on the mobile phone 137 and/or carrying out tracking tasks. The monitoring and target modules 309 are operable to log usage information, for example, calls made and/or data transmitted from the mobile phone 137 as well as determined geographic locations. In this regard, the log data is transferred to the tracking servers 121.

The local operation modules 311 comprise instructions and/or data for carrying out communications, data processing and/or human interface operations on the mobile phone 137. The phone book 313 provides storage for phone numbers and/or addresses utilized by users of the mobile phone 137. The files 315 region comprise user files such as multimedia files that a user stores on the mobile phone 137. The multimedia files are downloaded to the device and/or captured by one or more of human interfaces such as the microphone 321 or camera 323 for example.

The mobile phone 137 comprises a plurality of human interfaces that are utilized for capturing communication information and for interfacing with various features within the cellular phone 137. For example the mobile phone comprises a display 319 and speaker 327 that produce images and/or sound for cellular communication or for rendering stored multi-media files for example. The microphone 321 and camera 323 are utilized for voice calling and/or for capturing and storing multi-media data. The keys and/or buttons comprise a keyboard and/or number entry for creating messages and/or interfacing with cellular phone 137 features. In various embodiments of the invention, other types of human interfaces may be utilized. For example, touch screen, voice and/or pressure sensors are utilized for inputting information.

In operation, information enabling secure communication between the mobile phone 137 and tracking server 121 are configured within the mobile phone 137 and within the tracking server 121. For example, a unique and/or secure device ID for the mobile phone 137 and a SIM card ID for the subscriber of the tracking service are stored in the mobile phone 137 and the tracking server 121. In addition, an IP address for the tracking server 121 is stored in the mobile phone 137. When the mobile phone is activated and attempts to make a call or access the internet, it registers with the tracking server 121 via the antenna 333, the cell network 161 and bridge 163 or via the WLAN antenna 305, router 143 and internet 153. The tracking server 121 authenticates the mobile phone 137 based on one or more of its unique device ID and its resident SIM card ID and checks the mobile phone 137's status. The mobile phone 137 reports its location and/or call history information and challenges its status with the tracking server 121. The tracking server communicates the status of the mobile phone 137 and/or any commands and/or requests for data. In this regard, various exchanges occur between the mobile phone 137 and the tracking server 121 based on the status of the cellular phone 137, user preferences and/or tracking server 121 features.

An exemplary usage scenario for managing, tracking and/or monitoring an endpoint device such as the cellular phone 137 comprises instances when the cellular phone 137 is missing and the owner wishes to determine whether it is simply misplaced or if it was stolen. The owner accesses the tracking server 121 management screens and requests the geographic location of the cellular phone 137. In instances when the cellular phone 137 is misplaced, the user locates the phone and retrieves it. In instances when the owner determines that a phone was stolen, the owner retrieves its geographic location and/or call or messaging history and reports the information to the police or other governing or management authority. In addition, the phone is operable to send a command or status that indicates that phone service and/or Internet access should be locked. In this regard, an unauthorized user could be prevented from using the phone. Alternatively, an owner lets a stolen phone continue to operate so that additional location and/or usage information is gathered.

In another exemplary usage scenario, the cellular phone 137 is shared by members of a family and/or given to a child to use. In the event that, for example, the child is missing, the owner or authorized subscriber of the tracking service accesses the tracking server 121 management screens and gather geographic location history and/or phone usage logs. The tracking server periodically locates the phone and/or retrieves phone usage events. In addition, the user requests that the tracking server 121 periodically call and/or message the phone according to the owner's preference. The police and/or other government agents utilize the tracking server 121 information and/or features to investigate such a problem, for example.

In another exemplary usage scenario, the owner lends the cellular phone or another endpoint device to a friend. In that scenario, the owner accesses the tracking server 121 via the management screens and authorizes the borrower to utilize the device by entering the borrower's SIM card ID. Alternatively, the owner lends the phone to a child and wishes to limit their usage of the phone. The owner configures the tracking server 121 to lock the phone when usage has reached a specified limit or between specified times.

In another exemplary usage scenario, an owner manages their own endpoint device. For example, the owner has to capability to have a record of when and/or where they were located when an access to the Internet was made. In this regard, an owner takes a series of photographs in different places with their cellular phone 137 and uploads the images to a server on the Internet after each photograph is taken. After some time, the owner wishes to know the order of events with regard to the image files. The owner accesses the tracking server 121 and determines the order of events based on the time and location of the cellular phone 137 when the images were uploaded.

In the event that an owner wishes to sell the cellular phone 137, the owner transfers their account to a new owner or deletes their account and authorizes the new owner to create a new one. The new owner has to re-configure the account. For example, the new owner may create a new password for their account and enters, for example, his or her own SIM card ID and user preferences via the tracking server 121 management screens.

Figure 4:
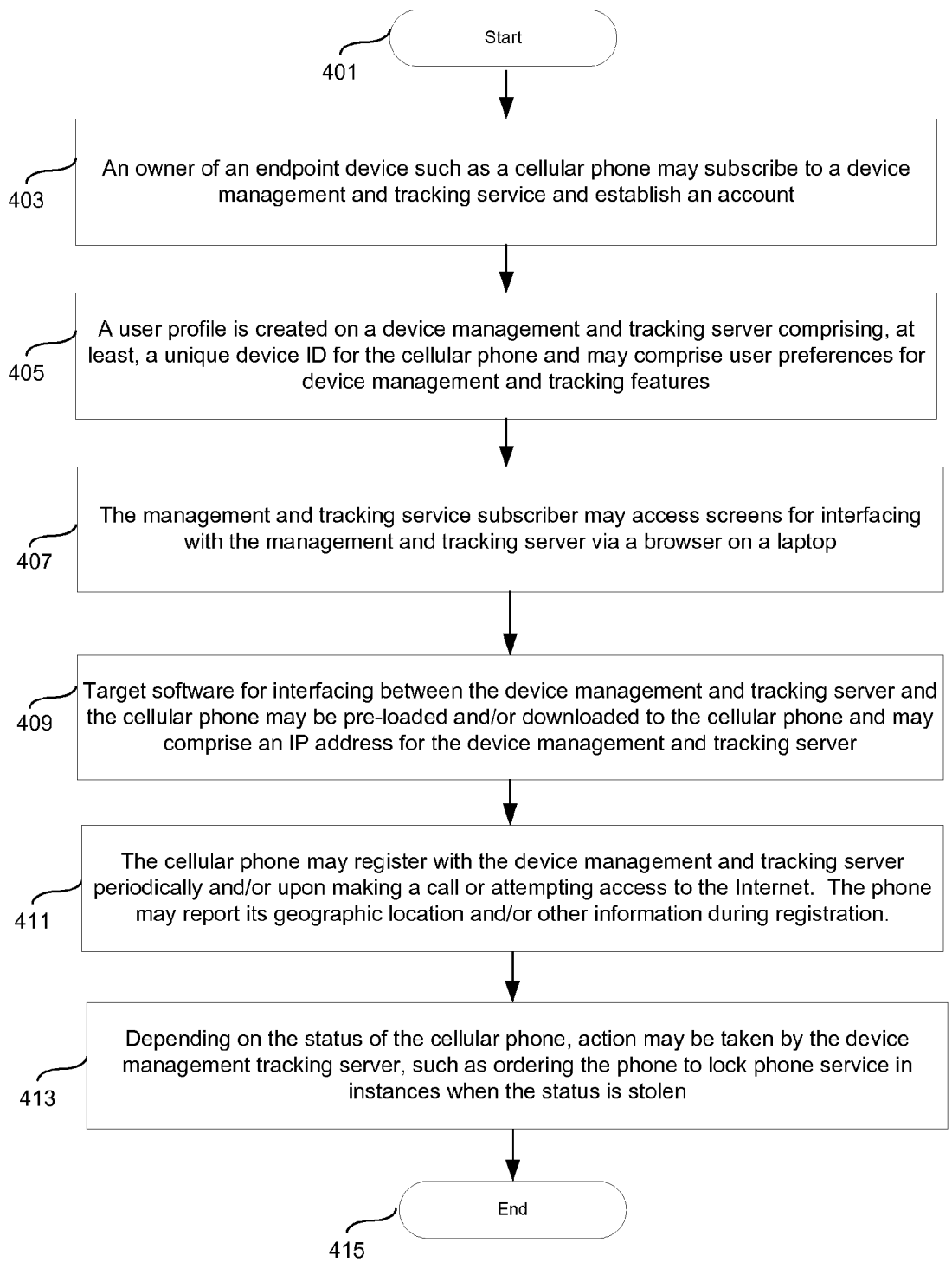
FIG. 4 is a flow chart illustrating exemplary steps for enabling endpoint device management and tracking, in accordance with an embodiment of the invention.

FIG. 4 is a flow chart illustrating exemplary steps for enabling endpoint device management and tracking, in accordance with an embodiment of the invention. Referring to FIG. 4, after start step 401, in step 403, an owner of an endpoint device such as a cellular phone 137 subscribes to a device management and tracking service and establishes an account. In step 405, a user profile is created on a device management and tracking server 121. The profile comprises a unique device ID for the cellular phone 137 and personal or user preferences for device management and tracking features. In step 407, the device management and tracking service subscriber accesses screens for interfacing with the management and tracking server 121 via a browser on a laptop 151. In step 409, target software for interfacing between the device management and tracking server 121 and the cellular phone 137 may be pre-loaded and/or downloaded to the cellular phone. The target software comprises an IP address for communicating with the device management and tracking server. In step 411, the cellular phone 137 registers with the device management and tracking server 121 periodically and/or upon making a call or attempting access to the Internet 153. The cellular phone 137 reports its geographic location and/or other information during the registration. In step 413, depending on the status of the cellular phone 137, one or more actions are taken by the device management tracking server 121, such as ordering the phone to lock its phone service. The exemplary steps may end at step 415.

In an embodiment of the invention, a subscriber initiates, from a first communication device, for example the laptop 151, tracking and/or disabling of at least a portion of the functionality of a second communication device, for example the cellular phone 137. In this regard, the subscriber owns the laptop 151 and cellular phone 137. In response to the subscriber's initiating of tracking and/or disabling the cellular phone's 137 functionality, the subscriber receives usage reports and/or location reports for the cellular phone 134 at the laptop 151. The cellular phone 137 is tracked based on a unique device identifier (ID) of the cellular phone 137 which is stored within its independent and/or static memory. The subscriber is enabled to securely access a server 121 via a client server interface from the laptop 151 for configuring and/or initiating the tracking and/or disabling of the mobile phone 137. In addition, the subscriber is provided with the capability to change a status of the cellular phone 137 and/or transfer secure access permission to another person via the client server interface.

A particular operation and/or event of a first communication device, for example the cellular phone 137, is detected based on a profile associated with the cellular phone 137. In response to detecting the particular operation, tracking of the cellular phone 137 and/or disabling all or a portion of its functionality is based on the profile. A status for the cellular phone 137 and/or request for tracking information is communicated to the cellular phone 137. Location and/or usage information from the tracking is communicated to a second tracking device, for example, the laptop 151 based on the profile. The laptop 151 receives the location and/or usage information. The profile specifies how tracking is done and/or which functions to disable. The profile comprises a status of the cellular phone 137 and is modifiable by an authorized user via a client interface. When the cellular phone 137 initiates access to a network, its unique device ID and/or a user's identity information is received from the cellular phone 137.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a communication method and infrastructure supporting device security and tracking of mobile and portable multimedia devices.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An electronic device comprising:
 a communication interface operable to communicate data with a remote device;
 a memory configured to store a unique device identifier assigned to the electronic device and a network address for the remote device;
 processing circuitry in data communication with the memory and responsive to data and instructions stored in the memory and configured to control the electronic device to:
 monitor activity of the electronic device;
 from time to time, send a registration communication to the remote device at the network address via the communication interface, the registration communication including the unique device identifier and a status challenge;
 receive from the remote device, via the communication interface, a control command to control operation of the electronic device, the control command being based on device management features established at the remote device in conjunction with a device management and tracking service for controlling operation of the electronic device; and respond to the control command.

2. The electronic device of claim 1 wherein the communication interface comprises at least one of:
a cellular radio,
a wireless local area network radio,
a Bluetooth radio.

3. The electronic device of claim 1 wherein the processing circuit is configured to:
determine that the status challenge communicated to the remote device failed; and
in response to failure of the status challenge, disable some or all functionality of the electronic device.

4. The electronic device of claim 1 wherein the processing circuit is configured to:
detect a lock command received from the remote device; and
in response to the lock command, disable some or all functionality of the electronic device.

5. The electronic device of claim 1 further comprising a monitoring module configurable to monitor activity of the electronic device, the monitoring module including data and instructions stored in secure memory protected from modification or deletion by an unauthorized user of the electronic device.

6. The electronic device of claim 1 further comprising:
a location determining circuit configured to determine geographical location of the electronic device,
wherein the processing circuitry is in data communication with the location determining circuit and is further configured to report location information for the electronic device with the registration communication.

7. An electronic device comprising:
a communication interface operable to communicate data with a remote device;
circuitry configured to process data representative of images;
a memory configured to store a unique device identifier assigned to the electronic device and a network address for the remote device;
processing circuitry in data communication with the memory and responsive to data and instructions stored in the memory and configured to control the electronic device to:
monitor activity of the electronic device;
from time to time, send a registration communication to the remote device at the network address via the communication interface, the registration communication including the unique device identifier and a status challenge;
receive from the remote device, via the communication interface, a control command to control operation of the electronic device, the control command being based on device management features established at the remote device in conjunction with a device management and tracking service for controlling operation of the electronic device; and
respond to the control command.

8. An endpoint device comprising:
a communication interface for data communication over at least one data network;
a memory storing data to operate portions of the endpoint device;
a unique device identifier assigned to the endpoint device;
a network address for the endpoint device;
a circuit in data communication with the memory and responsive to the stored data to
communicate data, including the unique device identifier and the network address for the endpoint device, via the communication interface, with a remote device to register with the remote device;
receive a data communication via the communication interface, the data communication including a control command including data arranged to control operation of the endpoint device; and
respond to the control command.

9. The endpoint device of claim 8 wherein the circuit is configured to receive a lock command as the control command and to respond to the lock command by disabling at least a portion of functionality of the endpoint device.

10. An endpoint device comprising:
a communication interface for data communication over at least one data network;
a memory storing data to operate portions of the endpoint device;
a unique device identifier assigned to the endpoint device;
a network address for the endpoint device;
a circuit in data communication with the memory and responsive to the stored data to
communicate data, including the unique device identifier and the network address for the endpoint device, via the communication interface, with a remote device to register with the remote device;
receive a data communication via the communication interface, the data communication including a control command including data arranged to control operation of the endpoint device;
respond to the control command; and
communicate via the communication interface with device management features established at the remote device in conjunction with an endpoint device management and tracking service for controlling operation of the endpoint device.

11. The endpoint device of claim 10 wherein the circuit is configured to communicate via the communication interface status information for the endpoint device and a network access request to the remote device and, based on status information for the endpoint device maintained by the endpoint device management and tracking service, receive a control command to control operation of the endpoint device.

12. The endpoint device of claim 11 wherein the circuit is configured to receive a control command to lock further operation of the endpoint device when the status information for the endpoint device indicates the endpoint device is lost or stolen.

13. The endpoint device of claim 11 wherein the endpoint device further comprises a circuit to determine geographic location of the endpoint device and wherein the circuit is configured to receive a control command to subsequently determine the geographic location of the endpoint device and report the determined geographic location to the remote device when the status information for the endpoint device indicates the endpoint device is lost or stolen.

14. A method comprising:
at a server system,
receiving from a monitor device data including a unique device identifier for a device to be tracked;
in response to the received data, establishing a device profile and a tracking function including the unique device identifier for the device to be tracked;
receiving additional data from the monitor device to initiate a status function for the device to be tracked;

communicating to the device to be tracked a server command to control the device to be tracked;
receiving from the device to be tracked data defining status information of the device to be tracked; and
in response to the received data defining status information, communicating to the monitor device data about the status of the device to be tracked.

15. The method of claim 14 further comprising:
at the server system,
receiving from the device to be tracked a registration communication, the registration communication including the unique device identifier for the device to be tracked and a status challenge.

16. The method of claim 15 further comprising:
at the server system,
in response to the registration communication, comparing data of the registration communication with the device profile using the unique device identifier; and
processing the registration communication according to information in the device profile.

17. The method of claim 16 further comprising:
at the server system,
determining from the device profile device management features activated for the device to be tracked; and
in response to an activated tracking feature, maintaining a history of geographic locations reported to the server system by the device to be tracked.

18. The method of claim 16 further comprising:
at the server system,
determining from the device profile device management features activated for the device to be tracked; and
in response to a lock feature activated for the device to be tracked, communicating a lock command to the device to be tracked to cause the device to be tracked to disable one or more functions of the device to be tracked.

19. The method of claim 18 further comprising:
at the server system,
receiving configuration data to selectively activate one more device management features for the device to be tracked; and
storing the data in memory as part of the device profile.

20. The method of claim 14 further comprising, at the server system, communicating with the device to be tracked over a wireless local area network.

* * * * *

UNITED STATES PATENT AND TRADEMARK OFFICE
CERTIFICATE OF CORRECTION

PATENT NO.        : 9,326,129 B2
APPLICATION NO.   : 14/328344
DATED             : April 26, 2016
INVENTOR(S)       : James D. Bennett et al.

Page 1 of 1

It is certified that error appears in the above-identified patent and that said Letters Patent is hereby corrected as shown below:

In the Claims

Column 16, claim 19, line 15, after "selectively activate one" insert --or--.

Signed and Sealed this
Twenty-eighth Day of June, 2016

Michelle K. Lee
*Director of the United States Patent and Trademark Office*